United States Patent
Shimomura et al.

(10) Patent No.: US 7,355,643 B2
(45) Date of Patent: Apr. 8, 2008

(54) IMAGE PICKUP DEVICE

(75) Inventors: Kenichi Shimomura, Tokyo (JP); Yoshikazu Kondo, Tokyo (JP); Yoichi Kato, Tokyo (JP); Kenji Watanabe, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 680 days.

(21) Appl. No.: 10/934,514

(22) Filed: Sep. 7, 2004

(65) Prior Publication Data
US 2005/0057673 A1    Mar. 17, 2005

(30) Foreign Application Priority Data
Sep. 12, 2003    (JP)    ............... 2003-321936

(51) Int. Cl.
*H04N 3/14*    (2006.01)
(52) U.S. Cl. ................... 348/294; 348/240.99
(58) Field of Classification Search ............ 348/208.6, 348/240.99–240.3, 294, 312
See application file for complete search history.

(56) References Cited

U.S. PATENT DOCUMENTS 6,580,457 B1 * 6/2003 Armstrong et al. ......... 348/317
7,231,100 B2 * 6/2007 Pilu ....................... 382/298

FOREIGN PATENT DOCUMENTS

| JP | 9-326957 | 12/1997 |
|----|----------|---------|
| JP | 10-336494 | 12/1998 |

* cited by examiner

*Primary Examiner*—Tuan Ho
*Assistant Examiner*—David Holt
(74) *Attorney, Agent, or Firm*—McDermott Will & Emery LLP

(57) ABSTRACT

An image pickup control unit specifies a scan area of a frame based on a scaling factor for electronic zooming. An image sensor converts incoming light signals into electric signals by performing reset scanning on each line of the specified scan area of the frame, and accumulates each of the electric signals, and reads the electric signals accumulated thereby by performing read scanning to output them as image data. In response to an instruction for changing a horizontal scanning period and a vertical scanning period of an Nth frame and later frames in a series of frames from the image pickup control unit, the image sensor performs reset scanning and read scanning on the Nth frame based on the changed horizontal scanning and vertical scanning periods even when a reset scanning period of the Nth frame partially overlaps a read scanning period of an immediately preceding (N−1)th frame.

5 Claims, 9 Drawing Sheets

IMAGE PICKUP DEVICE

BACKGROUND OF THE INVENTION

1. Field of the Invention

The present invention relates to an image pickup device having an electronic zooming function of zooming in on an image (i.e., enlarging the image).

2. Description of Related Art

As an image pickup device having the electronic zooming function, there has provided a digital camera having an image zooming display function disclosed in patent reference 1. This digital camera can create a zoom-in display of a moving image, a static image, or a reproduced image which is displayed on a liquid crystal display when shooting. The digital camera uses a frame memory as a memory for display of images, and is provided with an image display device that can display a moving image, a desired image specifying unit for specifying a desired image, and an enlarged image displaying unit for enlarging the desired image specified by the desired image specifying unit and displaying the specified, desired image with a predetermined scaling factor on the image display device.

There has also been provided an image processing device disclosed by patent reference 2 as an image pickup device that implements an electronic zooming function by changing the sampling frequency of incoming image signals. The image processing device is provided with a charge-coupled image sensor, an analog signal processing unit, an A/D converter, an image memory as a frame buffer, a digital signal processing unit, a D/A converter, a monitor, a variable sampling clock generating unit, a system control unit, and a scaling-factor setting unit.

[Patent reference 1] Japanese patent application publication (TOKKAIEHI) No. 10-336494 (see paragraphs denoted by 0010, 0011, and 0016)

[Patent reference 2] Japanese patent application publication (TOKKAIEHI) No. 9-326957 (see paragraphs denoted by 0025, 0026, and 0028)

A problem with a prior art image pickup device constructed as mentioned above is that it has to be provided with a large amount of frame memory in order to keep the frame rate constant when performing electronic zooming, and this results in an increase in the power consumption of the image pickup device, an increase in the size of the image pickup device, and an increase in the cost of the image pickup device. In particular, it is difficult to apply the prior art image pickup device to equipment for mobile use.

SUMMARY OF THE INVENTION

The present invention is made in order to solve the above-mentioned problem, and it is an object of the present invention to provide an image pickup device that can keep the frame rate constant at a time of performing electronic zooming without using a large amount of frame memory and that can be applied to equipment for mobile use.

In accordance with the present invention, there is provided an image pickup device including: an image pickup control unit for specifying a scan area of a frame whose horizontal scanning period and vertical scanning period have been changed based on a scaling factor for electronic zooming; an image sensor for converting light signals accepted thereby into electric signals by performing a reset scanning on each line of the scan area of the frame specified by the image pickup control unit, for accumulating each of the electric signals in a pixel array disposed therein, for reading the electric signals accumulated in the pixel array by performing read scanning on the pixel array and outputting it as image data, and for, in response to an instruction for changing a horizontal scanning period and a vertical scanning period for an Nth frame and later frames in a series of frames from the image pickup control unit, performing reset scanning and read scanning on the Nth frame based on the horizontal scanning period and the vertical scanning period which have been changed even when a reset scanning period of the Nth frame partially overlaps a read scanning period of an (N−1)th frame immediately preceding the Nth frame; a register for holding a part of the image data of the frame outputted from the image sensor; an RW control unit for writing the image data about at least the one line of the frame outputted from the image sensor based on the scaling factor for electronic zooming in the register, and for reading the image data about at least the one line of the frame currently being held thereby at a predetermined frame rate; and a resolution converting unit for performing interpolation processing on the image data read by the RW control unit based on the scaling factor for electronic zooming, and for converting the image data into image data having a size of one frame.

According to the present invention, the image pickup control unit specifies the scan area of a frame whose horizontal scanning period and vertical scanning period have been changed based on a scaling factor for electronic zooming, the image sensor converts light signals accepted thereby into electric signals by performing the reset scanning on each line of the scan area of the frame specified by the image pickup control unit for accumulating each of the electric signals in a pixel array disposed therein, and reads the electric signals accumulated in the pixel array by performing the read scanning on the pixel array and outputs them as image data. The RW control unit writes the image data about at least the one line of the frame outputted from the image sensor based on the scaling factor for electronic zooming in the register, and reads the image data about at least the one line of the frame currently being held thereby at a predetermined frame rate, and the resolution converting unit performs interpolation processing on the image data read by the RW control unit based on the scaling factor for electronic zooming so as to convert the image data into image data having a size of one frame. Therefore, the image pickup device can keep the frame rate constant when performing electronic zooming on the image data without using a large amount of frame memory. In addition, in response to an instruction for changing the horizontal scanning period and the vertical scanning period for the Nth frame and later frames in a series of frames from the image pickup control unit, the image sensor performs the reset scanning and the read scanning on the Nth frame based on the horizontal scanning period and the vertical scanning period which have been changed even when a reset scanning period of the Nth frame partially overlaps a read scanning period of an (N−1)th frame immediately preceding the Nth frame. Therefore, the image pickup device can keep the exposure time constant and can therefore provide a uniform image for the Nth frame.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the present invention will be now described with reference to the accompanying drawings. Embodiment 1.

Figure 1:
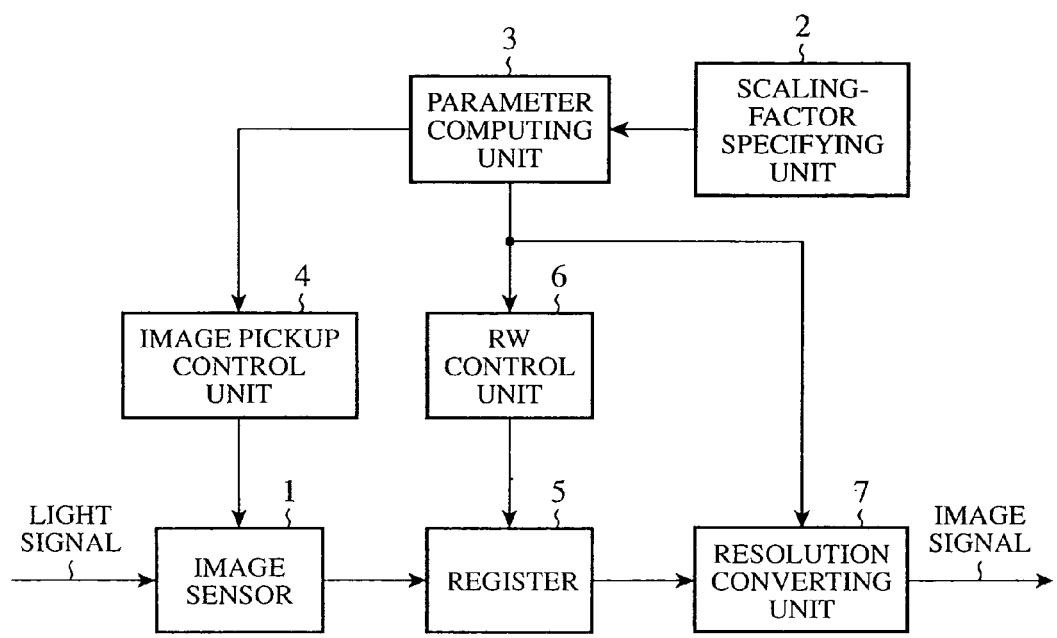
FIG. 1 is a block diagram showing the structure of an image pickup device in accordance with embodiment 1 of the present invention.

FIG. 1 is a block diagram showing the structure of an image pickup device in accordance with embodiment 1 of the present invention. In the figure, an image sensor 1 converts incoming light signals into electric signals and accumulates each of them, and reads the electric signals accumulated thereby and outputs them as image data. The image sensor 1 is equipped with a pixel array with a VGA (Variable Graphic Array)—equivalent size of 640×480 pixels. This pixel array is constructed of a solid state image pickup element, such as a CCD (Charge Coupled Device) or CMOS (Complementary Metal Oxide Semiconductor) image sensor. For the sake of simplicity, light shielded pixels which are always in a shielded state in the vicinity of an effective pixel area are not shown in the figure.

In FIG. 1, a scaling-factor specifying unit 2 specifies a scaling factor for electronic zooming, and a parameter computing unit 3 computes image pickup parameters associated with electronic zooming based on the scaling factor for electronic zooming specified by the scaling-factor specifying unit 2. An image pickup control unit 4 specifies a scan area of each frame which consists of an effective pixel area and a blanking area, the scan area being scanned by the image sensor 1, based on the image pickup parameters computed by the parameter computing unit 3, and controls the scanning timing at which the image sensor 1 scans the scan area of each frame.

In FIG. 1, a register 5 temporarily holds image data about one line of each frame outputted from the image sensor 1, and makes a correction to a change in the data rate during one horizontal scanning period, which changes according to the scaling factor for electronic zooming. The register 5 can be an FIFO (First In First Out) having a small capacity of about 17 Kbits. An RW (Read Write) control unit 6 writes the image data about at least one line of each frame outputted from the image sensor 1 in the register 5 based on the image pickup parameters computed by the parameter computing unit 3, and reads the image data about at least one line currently being held thereby at a predetermined frame rate. A resolution converting unit 7 performs interpolation processing on the image data read from the register 5 based on the image pickup parameters computed by the parameter computing unit 3, and converts the image data into image data having a size of one frame and outputs this image data as an image signal.

Next, the operation of the image pickup device in accordance with embodiment 1 of the present invention will be explained. The parameter computing unit 3 computes image pickup parameters associated with electronic zooming, i.e., a pixel-by-pixel horizontal scanning period PH, a line-by-line vertical scanning period PV, a vertical scanning start line VSTRT, the number of vertical scanning lines VSIZE, a horizontal scanning start pixel HSTRT, and the number of horizontal scanning pixels HSIZE based on the scaling factor for electronic zooming specified by the scaling-factor specifying unit 2.

Hereafter, assuming that in a case where the scaling factor for electronic zooming is one time, the horizontal scanning period is PHi, the vertical scanning period is PVi, the number of vertical scanning lines is VSIZEi, the number of horizontal scanning pixels is HSIZEi, and a central part of image data about one frame is electronically zoomed in on N times. The parameter computing unit 3 computes the horizontal scanning period PH, the vertical scanning period PV, the vertical scanning start line VSTRT, the number of vertical scanning lines VSIZE, the horizontal scanning start pixel HSTRT, and the number of horizontal scanning pixels HSIZE according to the following equations (1) to (6):

$$PH = PHi \times N \quad (1)$$

$$PV = PVi/N \quad (2)$$

$$VSTRT = VSIZEi/2 \times (1 - 1/N) \quad (3)$$

$$VSIZE = VSIZEi/N \quad (4)$$

$$HSTRT = HSIZEi/2 \times (1 - 1/N) \quad (5)$$

$$HSIZE = HSIZEi/N \quad (6)$$

For example, when $PHi=800$, $PVi=600$, $HSIZEi=640$, $VSIZEi=480$, and $N=2$, the following parameters: $PH=1600$, $PV=300$, $VSTRT=120$, $VSIZE=240$, $HSTRT=160$, and $HSIZE=320$ are obtained from the above-mentioned equations (1) to (6). VSTRT is an integer value that is defined in such a manner that it has a value of 0 when indicating the first line, and HSTRT is an integer value that is defined in such a manner that it has a value of 0 when indicating the first pixel.

The image pickup control unit 4 specifies the scan area of each frame which the image sensor 1 will scan and which consists of an effective pixel area and a blanking area based on the image pickup parameters, i.e., the horizontal scanning period PH, the vertical scanning period PV, the vertical scanning start line VSTRT, and the number of vertical scanning lines VSIZE which are computed by the parameter computing unit 3. The image pickup control unit 4 also controls the scanning timing at which the image sensor 1 scans the scan area of each frame.

Figure 2:
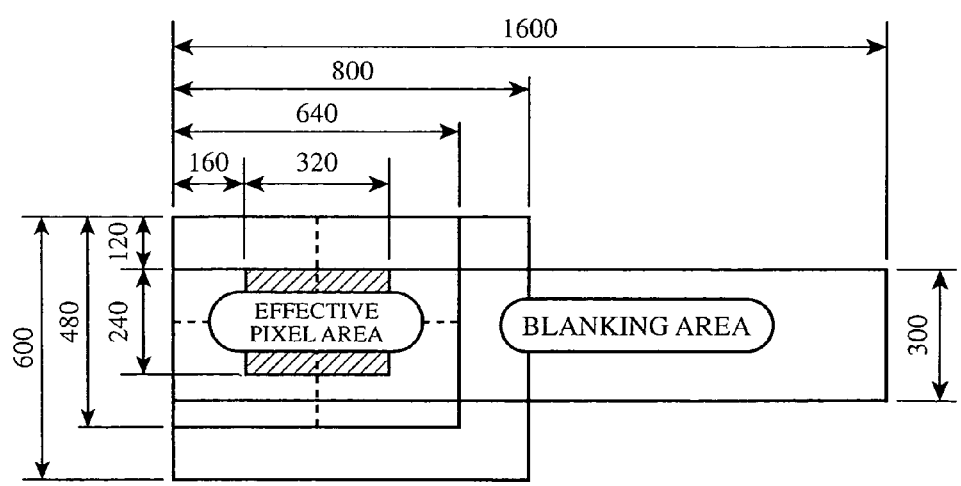
FIG. 2 is a diagram explaining a scan area of each frame which is specified by an image pickup control unit of the image pickup device in accordance with embodiment 1 of the present invention.

FIG. 2 is a diagram explaining the scan area of each frame which is specified by the image pickup control unit 4. Hereafter, assuming that in a case where the scaling factor for electronic zooming is one time, the horizontal scanning period $PHi=800$, the vertical scanning period $PVi=600$, the number of horizontal scanning pixels $HSIZEi=640$, and the number of vertical scanning lines $VSIZEi=480$, when the scaling factor for electronic zooming is two times, the scan area of each frame has a size of $PH \times PV=1600 \times 300$ pixels and consists of an effective pixel area (i.e., an area with a size of 640×300 pixels in the figure) including an area to be electronically zoomed in on (i.e., a hatched area having a size of 320×240 pixels in the figure) and a blanking area. In the example of FIG. 2, the vertical scanning start line VSTRT is 120, the number of vertical scanning lines VSIZE is 240, the horizontal scanning start pixel HSTRT is 160, and the number of horizontal scanning pixels HSIZE is 320.

The image sensor 1 converts incoming light signals into electric signals and accumulates each of them by performing reset scanning and read scanning, which will be mentioned below, on the scan area of each frame specified by the image pickup control unit 4 based on the scanning timing from the image pickup control unit 4, and reads the electric signals accumulated thereby and outputs them as image data.

Since the scan area of each frame specified by the image pickup control unit 4 has a size of 800×600 pixels when the scaling factor for electronic zooming is one time, and has a size of 1,600×300 pixels when the scaling factor of electronic zoom is tow times, the scan area has a size of 480,000 pixels regardless of the scaling factor for electronic zooming. Therefore, the image data outputted from the image sensor 1 has a constant frame rate regardless of the scaling factor for electronic zooming.

The RW control unit 6 writes the image data about at least one line of each frame outputted from the image sensor 1 in the register 5 based on the image pickup parameters, i.e., the horizontal scanning start pixel HSTRT and the number of horizontal scanning pixels HSIZE which are computed by the parameter computing unit 3, and reads the image data about at least the one line of each frame currently being held by the register 5 at a predetermined frame rate.

When the scaling factor for electronic zooming is one time, since the number of horizontal scanning pixels $HSIZEi=640$, as shown in FIG. 2, the RW control unit 6 writes pixel data about one 640-pixel line in the register 5 which consists of an FIFO or the like, and reads the one line of the image data currently being held by the register at a predetermined frame rate. This processing is performed on each line, and therefore, it is repeatedly carried out on each of 480 lines because $VSIZEi=480$. As a result, the image data about each frame is outputted to the resolution converting unit 7.

When the scaling factor for electronic zooming is two times, since the horizontal scanning start pixel $HSTRT=160$ and the number of horizontal scanning pixels $HSIZE=320$, as shown in FIG. 2, the RW control unit 6 writes pixel data about one 320-pixel line in the register 5 which consists of an FIFO or the like, and reads the one line of the image data currently being held by the register at the same predetermined frame rate as that in the case where the scaling factor for electronic zooming is one time. This processing is performed on each line, and therefore, it is repeatedly carried out on each of 240 lines because $VSIZE=240$. As a result, the image data about the area electronically zoomed in on in each frame is outputted to the resolution converting unit 7.

Figure 3:
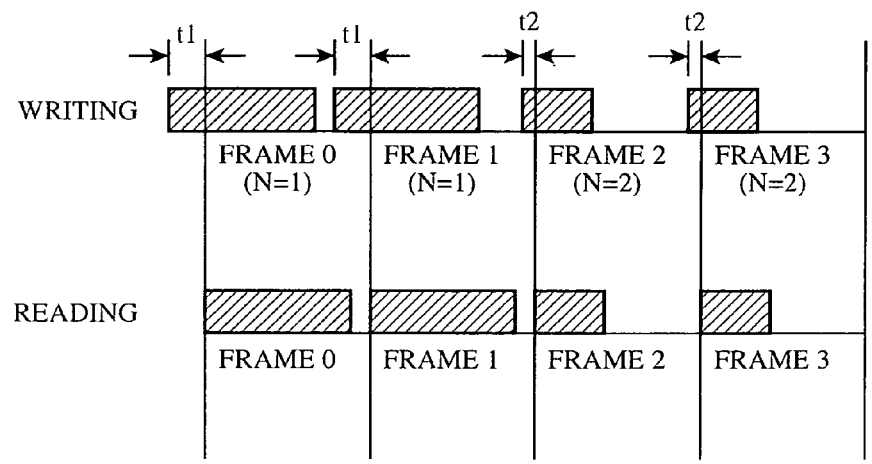
FIG. 3 is a timing chart showing timings at which a RW control unit of the image pickup device in accordance with embodiment 1 of the present invention performs writing of image data to a register and reading of image data from the register.

FIG. 3 is a timing chart showing the timing at which the RW control unit 6 performs writing of image data into the register 5 and the timing at which the RW control unit 6 performs reading of image data from the register 5. As mentioned above, the RW control unit 6 reads each line of the image data after completing the writing of the image data into the register 5. Therefore, in order to read the image data at a constant frame rate regardless of the scaling factor for electronic zooming, the RW control unit 6 has to start the writing of the image data into the register 5 at an earlier time as the number of pixels included in each line increases.

That is, as shown in FIG. 3, the length of a time t1 when the RW control unit 6 starts writing image data about each of frames 0 and 1 (i.e., 0th and 1st frames) having a scaling factor of one for electronic zooming (N=1) and having a larger number of pixels included in each line into the register 5 is larger than that of a time t2 when the RW control unit 6 starts writing image data about each of frames 2 and 3 (i.e., 2nd and 3rd frames) having a scaling factor of two for electronic zooming (N=2) and having a smaller number of pixels included in each line into the register 5 (i.e., t1>t2). The time t1 is the one when the RW control unit 6 starts writing image data about each of the 0th and 1st frames with respect to the time when the RW control unit 6 starts reading each of the 0th and 1st frames, and the time t2 is the one when the RW control unit 6 starts writing image data about each of the 2nd and 3rd frames with respect to the time when the RW control unit 6 starts reading each of the 2nd and 3rd frames. Thus, the register 5, such as an FIFO, makes a correction to a change in the data rate due to a change in the scaling factor for electronic zooming in order to keep the frame rate constant regardless of the scaling factor for electronic zoom.

The resolution converting unit 7 performs interpolation processing on the image data read from the register 5 based on the image pickup parameters computed by the parameter computing unit 3, i.e., the number of horizontal scanning pixels HSIZE and the number of vertical scanning lines VSIZE so as to convert the image data into image data having a size of one frame, and then outputs the image data as an image signal.

That is, when the scaling factor for electronic zoom is one time, since the number of horizontal scanning pixels HSIZEi=640 and the number of vertical scanning lines VSIZEi=480, the resolution converting unit 7 outputs, as an image signal, the image data about each frame read from the register 5 without carrying out any interpolation processing on the image data, just as it is.

On the other hand, when the scaling factor for electronic zoom is two times, since the number of horizontal scanning pixels HSIZE=320 and the number of vertical scanning lines VSIZE=240, the resolution converting unit 7 enlarges the image data about each frame read from the register 5 to two times the original size in every direction so as to convert it into image data having a size of one frame, and outputs the image data as an image signal.

The image pickup device having such the structure can keep the frame rate constant at the time of performing electronic zooming without having to use a large amount of frame memory which prior art image pickup devices use. In accordance with this embodiment 1, the image sensor 1 has a so-called VGA size of 640×480 pixels, as previously mentioned. As the number of pixels of the image sensor 1 increases and hence the resolution increases, the effect of reducing the circuit scale because of not using any frame memory can be further enhanced.

In addition, in accordance with this embodiment 1, when performing electronic zooming on an image of a frame, the image pickup device zooms in on the image while setting the central part of the image data about the frame, i.e., the center of the frame as the center for electronic zooming. When zooming in on a frame image while setting a point which is horizontally offset by only HOFS and is vertically offset by only VOFS from the center of the frame, as the center for electronic zooming, the parameter computing unit 3 computes the vertical scanning start line VSTRT and the horizontal scanning start pixel HSTRT according to the following equations (7) and (8):

$$VSTRT=VSIZEi/2\times(1-1/N)+VOFS \quad (7)$$

$$HSTRT=HSIZEi/2\times(1-1/N)+HOFS \quad (8)$$

In this embodiment 1, the above description is directed to the case where the image pickup device changes the scaling factor for electronic zooming from one time to N times. In general, when changing the scaling factor for electronic zooming from N1 times to N2 times, the image pickup device operates in the following way.

Assuming that when the scaling factor for electronic zooming is N1 times, the horizontal scanning period is PHi, the vertical scanning period is PV1, the vertical scanning start line is VSTRT1, the number of vertical scanning lines VSIZE1, the horizontal scanning start pixel HSTRT1, and the number of horizontal scanning pixels HSIZE1, and the image pickup device performs electronic zooming on the central part of image data about each frame's image so as to enlarge the central part to N times the original size, the parameter computing unit 3 computes the horizontal scanning period PH2, the vertical scanning period PV2, the vertical scanning start line VSTRT2, the number of vertical scanning lines VSIZE2, the horizontal scanning start pixel HSTRT2, and the number of horizontal scanning pixels HSIZE2 in the case where the scaling factor for electronic zooming is N2 times according to the following equations (9) to (14):

$$PH2=PH1\times(N2/N1) \quad (9)$$

$$PV2=PV1/(N2/N1) \quad (10)$$

$$VSTRT2=VSIZE1/2\times(1-N1/N2) \quad (11)$$

$$VSIZE2=VSIZE1/(N2/N1) \quad (12)$$

$$HSTRT2=HSIZE1/2\times(1-N1/N2) \quad (13)$$

$$HSIZE2=HSIZE1/(N2/N1) \quad (14)$$

When generally changing the scaling factor for electronic zooming from N1 times to N2 times and zooming in on a frame's image while setting a point which is horizontally offset by only HOFS and is vertically offset by only VOFS from the center of the frame, as the center for electronic zooming, the parameter computing unit 3 computes the vertical scanning start line VSTRT2 and the horizontal scanning start pixel HSTRT2 according to the following equations (15) and (16):

$$VSTRT2=VSIZE1/2\times(1-N1/N2)+VOFS \quad (15)$$

$$HSTRT2=HSIZE1/2\times(1-N1/N2)+HOFS \quad (16)$$

Thus, the image sensor 1 scans the scan area of each frame whose horizontal scanning period PH and vertical scanning period PV have been changed based on the scaling factor for electronic zooming specified by the image pickup control unit 4. Next, a relationship between both the reset scanning and the read scanning by the image sensor 1, and the exposure time will be explained.

Figure 4:
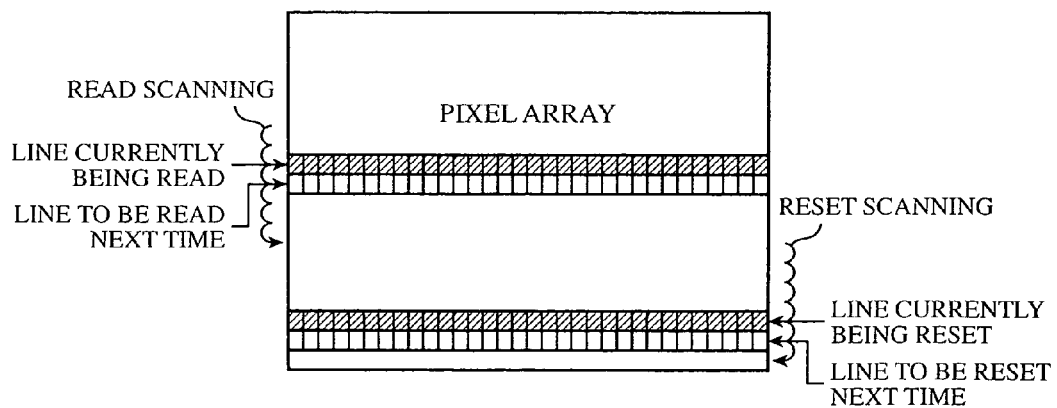
FIG. 4 is a diagram explaining reset scanning and read scanning performed on a pixel array disposed within an image sensor of the image pickup device in accordance with embodiment 1 of the present invention.

FIG. 4 is a diagram explaining the reset scanning and the read scanning performed on the pixel array disposed within the image sensor 1. Hereafter, a case where the image sensor 1 is of focal-plane shutter type (i.e., line transfer type) which is popular with CMOS image sensors each of which can constitute a pixel array will be explained.

As shown in FIG. 4, the pixel array is divided into a plurality of horizontal lines, and the image sensor performs the reset scanning on pixels by opening a shutter on a line-by-line basis so as to set the pixels at predetermined potentials. After that, the image sensor accumulates an electric signal corresponding to a light signal inputted to each of the pixels, and performs the read scanning on each of the pixels so as to read the electric signal accumulated in each of the pixels by closing the shutter. The image sensor sequentially performs the reset scanning and the read scanning on each of all lines while selecting each line in succession.

In FIG. 4, the period during which the image sensor scans each line in succession is the horizontal scanning period PH, and the time which has elapsed until the image sensor starts the read scanning since it completed the reset scanning is the exposure time. The fact that the exposure time is 10×PH means that the read scanning is being performed on a line which is located above another line on which the reset scanning is being performed by ten lines.

Figure 5:
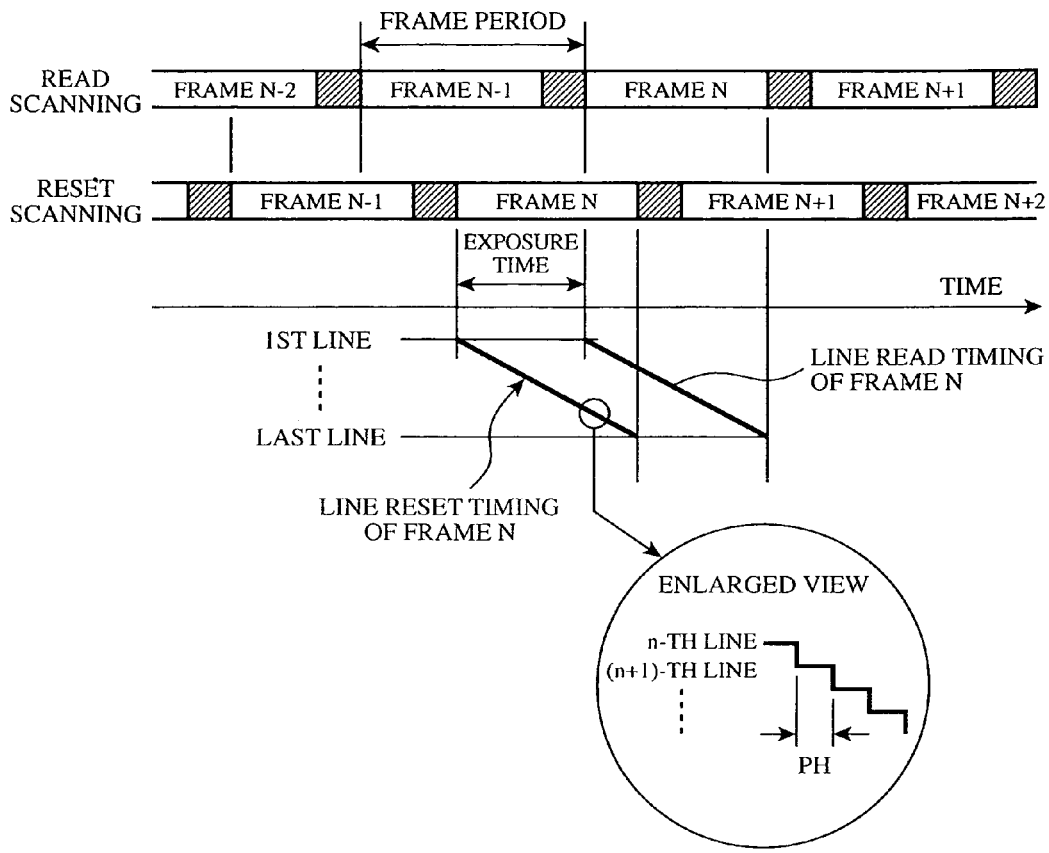
FIG. 5 is a diagram showing timing at which the image sensor performs the reset scanning on each frame, and timing at which the image sensor performs the read scanning on each frame.

FIG. 5 is a diagram showing the timing at which the image sensor performs the reset scanning on each frame, and the timing at which the image sensor performs the read scanning on each frame. As shown in FIG. 5, the line reset timing at which the image sensor performs the reset scanning on each line of a frame N (i.e., the Nth frame) precedes the line read timing at which the image sensor performs the read scanning on each line of the Nth frame, and the difference between the line reset timing of each line and the line read timing of each line is equivalent to the exposure time. As shown in an enlarged view in FIG. 5, both the gradient with respect to time of the line reset timing and the gradient with respect to time of the line read timing change according to the horizontal scanning period PH. Both the gradients become more gentle as the horizontal scanning period PH increases, whereas they become more steep as the horizontal scanning period PH decreases.

As shown in FIG. 5, lines included in each frame start being exposed to light at different exposure timings, but the exposure time of each line is identical and a uniform image is therefore obtained for the whole of each frame. In FIG. 5, while the cycle in which the image sensor performs the read scanning on each frame is kept constant in order to keep the frame rate constant, the cycle in which the image sensor performs the reset scanning on each frame is not kept constant, but needs to be changed according to the required exposure time in order to change the exposure time according to the brightness of a photographic object to be shot.

Figure 6:
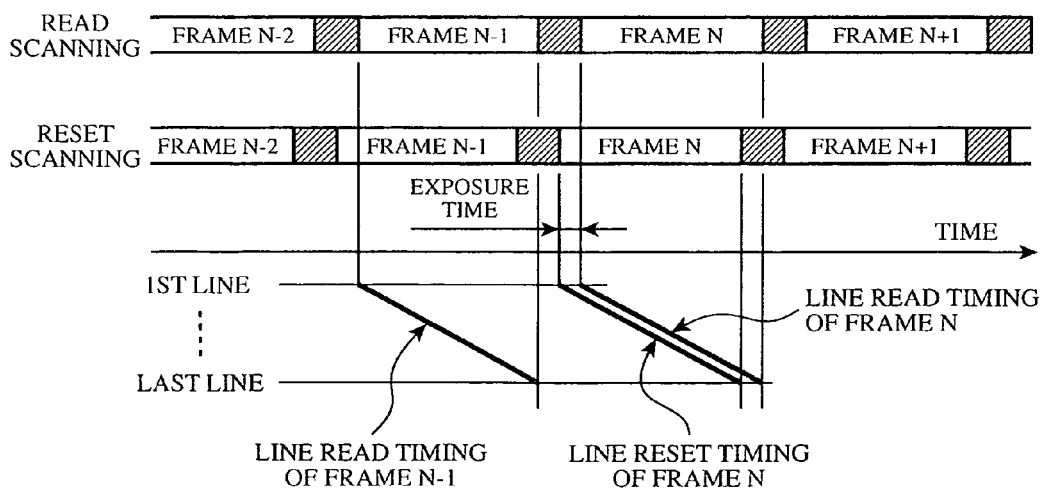
FIG. 6 is a diagram showing timing at which the image sensor performs the reset scanning on each frame, and timing at which the image sensor performs the read scanning on each frame when the exposure time of the image sensor is short.

FIG. 6 is a diagram showing the timing at which the image sensor performs the reset scanning on each frame, and the timing at which the image sensor performs the read scanning on each frame when the exposure time is short. As shown in FIG. 6, in this case, since the line reset timing at which the image sensor performs the reset scanning on the Nth frame is close to the line read timing at which the image sensor performs the read scanning on the Nth frame, and therefore the exposure time is short, the reset scanning period of the Nth frame does not overlap the read scanning period of the (N−1)th frame immediately preceding the Nth frame.

Figure 7:
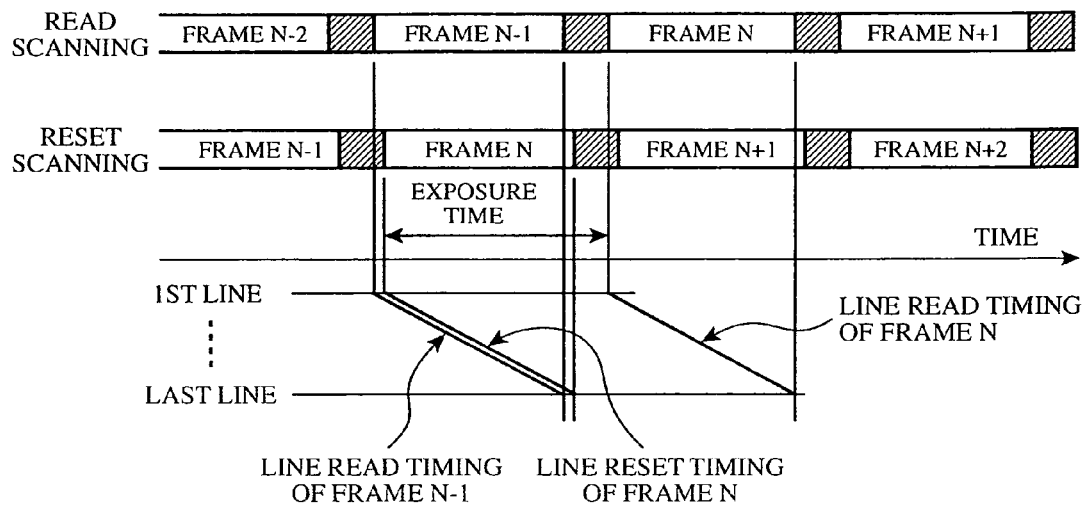
FIG. 7 is a diagram showing timing at which the image sensor performs the reset scanning on each frame, and timing at which the image sensor performs the read scanning on each frame when the exposure time of the image sensor is long.

FIG. 7 is a diagram showing the timing at which the image sensor performs the reset scanning on each frame, and the timing at which the image sensor performs the read scanning on each frame when the exposure time is long. As shown in FIG. 7, in this case, since the line reset timing at which the image sensor performs the reset scanning on the Nth frame is greatly apart from the line read timing at which the image sensor performs the read scanning on the Nth frame, and therefore the exposure time is long, the reset scanning period of the Nth frame almost completely overlaps the read scanning period of the (N−1)th frame immediately preceding the Nth frame.

Figure 8:
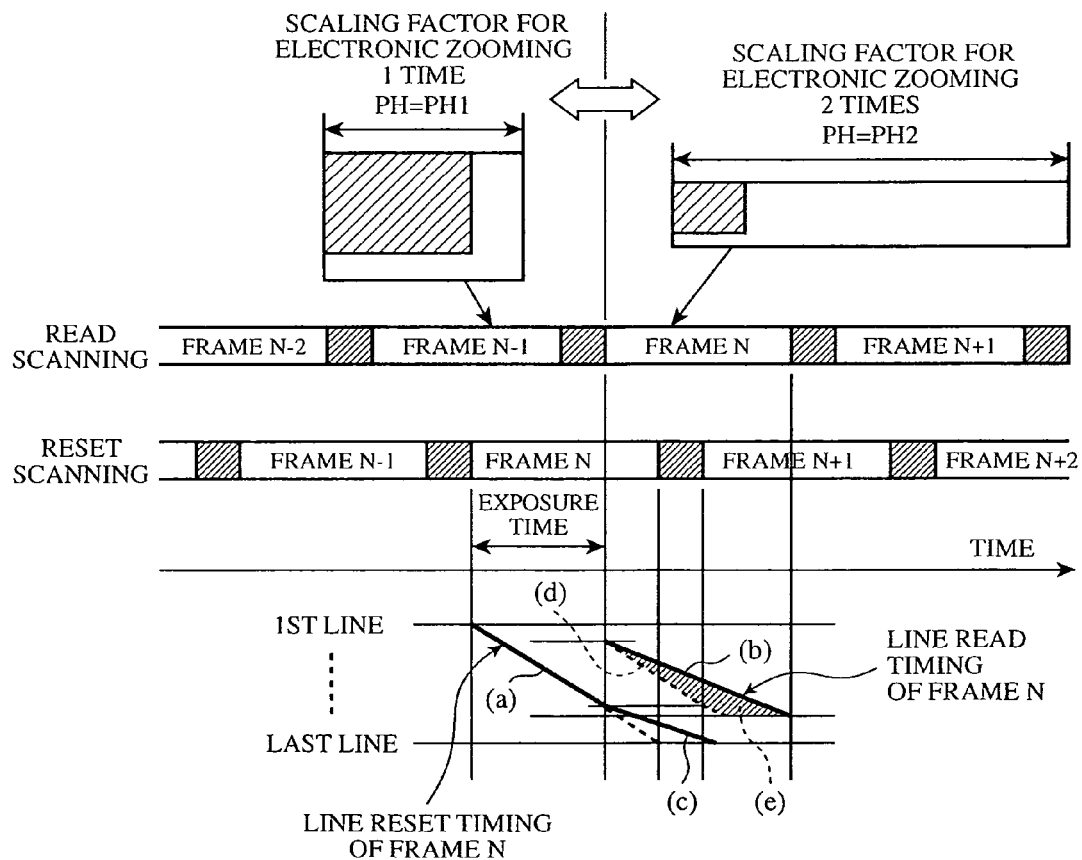
FIG. 8 is a diagram showing timing at which the image sensor performs the reset scanning on each frame, and timing at which the image sensor performs the read scanning on each frame when the exposure time of the image sensor is long and the scaling factor for electronic zooming of the image sensor changes.

FIG. 8 is a diagram showing the timing at which the image sensor performs the reset scanning on each frame, and the timing at which the image sensor performs the read scanning on each frame when the exposure time is long and the scaling factor for electronic zooming changes. That is, FIG. 8 shows the timing at which the image sensor performs the reset scanning on each frame, and the timing at which the image sensor performs the read scanning on each frame when the scaling factor for electronic zooming changes and hence the scan area of each frame of the image sensor 1 changes in a case where the exposure time is long and the reset scanning period of the Nth frame partially overlaps the read scanning period of the (N−1)th frame immediately preceding the Nth frame. In the example of FIG. 8, the image sensor is instructed to read up to the (N−1)th frame with a zooming scaling factor of one (i.e., the horizontal scanning period PH=PH1) and to read the Nth frame and later frames with a zooming scaling factor of two (i.e., the horizontal scanning period PH=PH2).

As shown in FIG. 8, when the image sensor starts the reset scanning of the Nth frame, the line reset timing of the Nth frame varies linearly with time according to a shown straight line (a) having a gradient determined by the horizontal scanning period PH1 corresponding to the scaling factor of one for electronic zooming. After the scaling factor for electronic zooming changes from one time to two times and the image sensor starts performing the read scanning on the Nth frame, the line read timing of the Nth frame varies linearly with time according to a shown straight line (b) having a gradient determined by the horizontal scanning period PH2 corresponding to the scaling factor of two for electronic zooming and the line reset timing of the Nth frame varies linearly with time according to a shown straight line (c) having the same gradient as the straight line (b). A fourth straight line (d) indicates the virtual line read timing having the same gradient as the straight line (a), and a fifth straight line (e) indicates the virtual line read timing having the same gradient as the straight line (c). The virtual line read timing of the Nth frame indicated by the fourth and fifth straight lines (d) and (e) is the one at which the exposure time is kept constant with respect to the line reset timing of the Nth frame indicated by the first and third straight lines (a) and (c).

However, since the line read timing of the Nth frame actually varies linearly with time according to the second straight line (b), the Nth frame is overexposed by only a time corresponding to a hatched area surrounded by the second, fourth, and fifth straight lines (b), (d), and (e) of FIG. 8. As a result, since the image becomes bright too much and the exposure time changes line by line, the image of the Nth frame from which the image sensor starts changing the scaling factor for electronic zooming does not become uniform and therefore unevenness of the brightness occurs in the image of the Nth frame. The example shown in FIG. 8 shows the case where the scaling factor for electronic zooming is increased when the exposure time is long and the reset scanning period of the Nth frame partially overlaps the read scanning period of the (N−1)th frame immediately preceding the Nth frame. In contrast, in a case where the scaling factor for electronic zooming is decreased when the exposure time is long and the reset scanning period of the Nth frame partially overlaps the read scanning period of the (N−1)th frame immediately preceding the Nth frame, the Nth frame is underexposed conversely. As a result, the image becomes dark too much, and the image does not become uniform and therefore unevenness of the brightness occurs in the image of the Nth frame.

Figure 9:
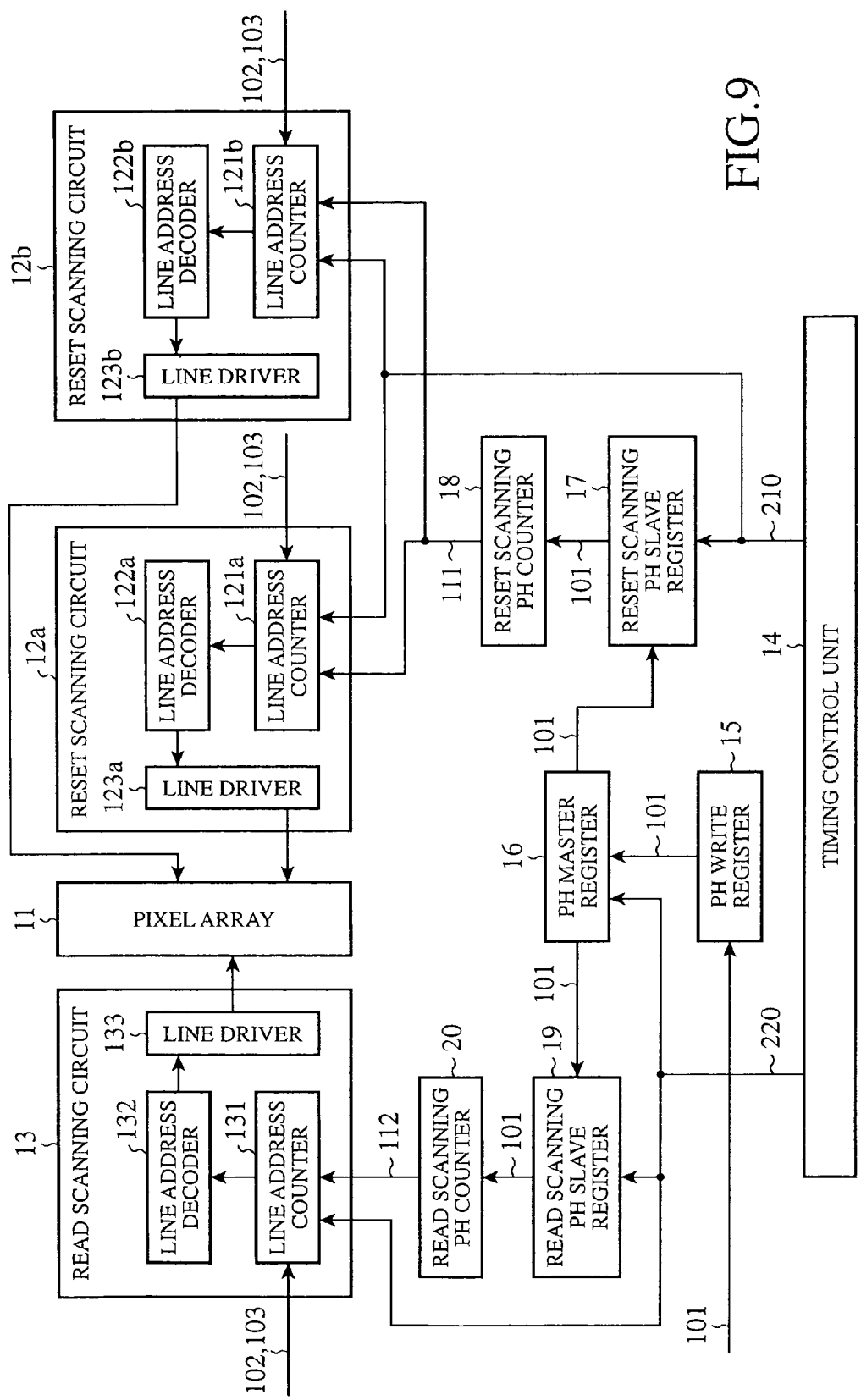
FIG. 9 is a diagram showing the internal structure of the image sensor of the image pickup device in accordance with embodiment 1 of the present invention.

FIG. 9 is a diagram showing the internal structure of the image sensor of the image pickup device in accordance with embodiment 1 of the present invention. In FIG. 9, the pixel array 11 has a VGA-equivalent size of 640×480 pixels, for example. A first reset scanning circuit 12*a* is provided with a line address counter 121*a*, a line address decoder 122*a*, and a line driver 123*a*, and performs the reset scanning on each line of the pixel array 11. A second reset scanning circuit 12*b* is provided with a line address counter 121*b*, a line address decoder 122*b*, and a line driver 123*b*, and performs the reset scanning on each line of the pixel array 11. The image sensor is thus provided with the two reset scanning circuits 12*a* and 12*b*. This is because the image sensor performs the reset scanning on each frame twice when changing the exposure time from a short one to a long one. A read scanning circuit 13 is provided with a line address counter 131, a line address decoder 132, and a line driver 133, and performs the read scanning on each line of the pixel array 11.

A timing control unit 14 controls various timings at which the image sensor 1 operates. The timing control unit 14 outputs a reset scanning start timing signal 210 for each frame in a cycle that is determined from the vertical scanning period PV specified by the image pickup control unit 4 in consideration of the exposure time, and outputs a read scanning start timing signal 220 for each frame in a cycle determined from the vertical scanning period PV. The horizontal scanning period PH 101 specified by the image pickup control unit 4 is written into a PH write register 15, and the write register 15 holds the horizontal scanning period PH 101 until the horizontal scanning period PH 101 is specified by the image pickup control unit 4 for the next time. The horizontal scanning period PH 101 currently being held by the PH write register 15 is written into a PH master register 16 in synchronization with the read scanning start timing signal 220 from the timing control unit 14, and the PH master register 16 holds the horizontal scanning period PH 101 until the next read scanning start timing comes.

The horizontal scanning period PH 101 currently being held by the PH master register 16 is written into a reset scanning PH slave register 17 in synchronization with the reset scanning start timing signal 210 from the timing control unit 14, and the reset scanning PH slave register 17 holds the horizontal scanning period PH 101 until the next reset scanning start timing comes. A reset scanning PH counter 18 counts the number of pixels of each line until a time that has elapsed since the reset scanning on each line was started agrees with the horizontal scanning period PH 101 currently being held by the reset scanning PH slave register 17, and outputs a line clock 111 every time when the reset scanning on each line is completed.

Similarly, the horizontal scanning period PH 101 currently being held by the PH master register 16 is written into a read scanning PH slave register 19 in synchronization with the next read scanning start timing signal 220 from the timing control unit 14, and the read scanning PH slave register 19 holds the horizontal scanning period PH 101 until the next read scanning start timing comes. A read scanning PH counter 20 counts the number of pixels of each line until a time that has elapsed since the read scanning on each line was started agrees with the horizontal scanning period PH 101 currently being held by the read scanning PH slave register 19, and outputs a line clock 112 every time when the read scanning on each line is completed.

When the next reset scanning start timing signal 210 is delivered thereto from the timing control unit 14, the line address counter 121a of the first reset scanning circuit 12a accepts the vertical scanning start line VSTRT 102 and the number of vertical scanning lines VSIZE 103 which indicate the effective pixel area outputted from the image pickup control unit 4, sets the vertical scanning start line VSTRT 102 to an initial value, and keep counting the line clock 111 until the reset scanning is performed on a vertical scanning end line defined by VEND=VSTRT+VSIZE−1. After that, the line address counter 121a outputs an output mask signal until the vertical scanning start line VSTRT 102 is set to the initial value for the next time. The line address decoder 122a decodes the value of the line address counter 121a, and, while the output mask signal is outputted by the line address counter 121a, masks its decoded output. The line driver 123a simultaneously selects two or more pixels at a line address decoded by the line address decoder 122a, and performs the reset scanning on the pixel array 11.

When the next reset scanning start timing signal 210 is delivered thereto from the timing control unit 14, the line address counter 121b of the second reset scanning circuit 12b accepts the vertical scanning start line VSTRT 102 and the number of vertical scanning lines VSIZE 103 which indicate the effective pixel area outputted from the image pickup control unit 4, sets the vertical scanning start line VSTRT 102 to an initial value, and keeps counting the line clock 111 until the reset scanning is performed on the vertical scanning end line defined by VEND=VSTRT+VSIZE−1. After that, the line address counter 121b outputs an output mask signal until the vertical scanning start line VSTRT 102 is set to the initial value for the next time. The line address decoder 122b decodes the value of the line address counter 121b, and, while the output mask signal is outputted by the line address counter 121b, masks its decoded output. The line driver 123b simultaneously selects two or more pixels at a line address decoded by the line address decoder 122b, and performs the reset scanning on the pixel array 11. Thus, the first and second reset scanning circuits 12a and 12b alternately works every time when the reset scanning start timing signal 210 is delivered thereto from the image pickup control unit 4.

When the next read scanning start timing signal 220 is delivered thereto from the timing control unit 14, the line address counter 131 of the read scanning circuit 13 accepts the vertical scanning start line VSTRT 102 and the number of vertical scanning lines VSIZE 103 which indicate the effective pixel area outputted from the image pickup control unit 4, sets the vertical scanning start line VSTRT102 to an initial value, and keeps counting the line clock 112 until the read scanning is performed on the vertical scanning end line defined by VEND=VSTRT+VSIZE−1. After that, the line address counter 131 outputs an output mask signal until the vertical scanning start line VSTRT 102 is set to the initial value for the next time. The line address decoder 132 decodes the value of the line address counter 131, and, while the output mask signal is outputted by the line address counter 131, masks its decoded output. The line driver 133 simultaneously selects two or more pixels at a line address decoded by the line address decoder 132, and performs the read scanning on the pixel array 11 line by line so as to read image data.

Figure 10:
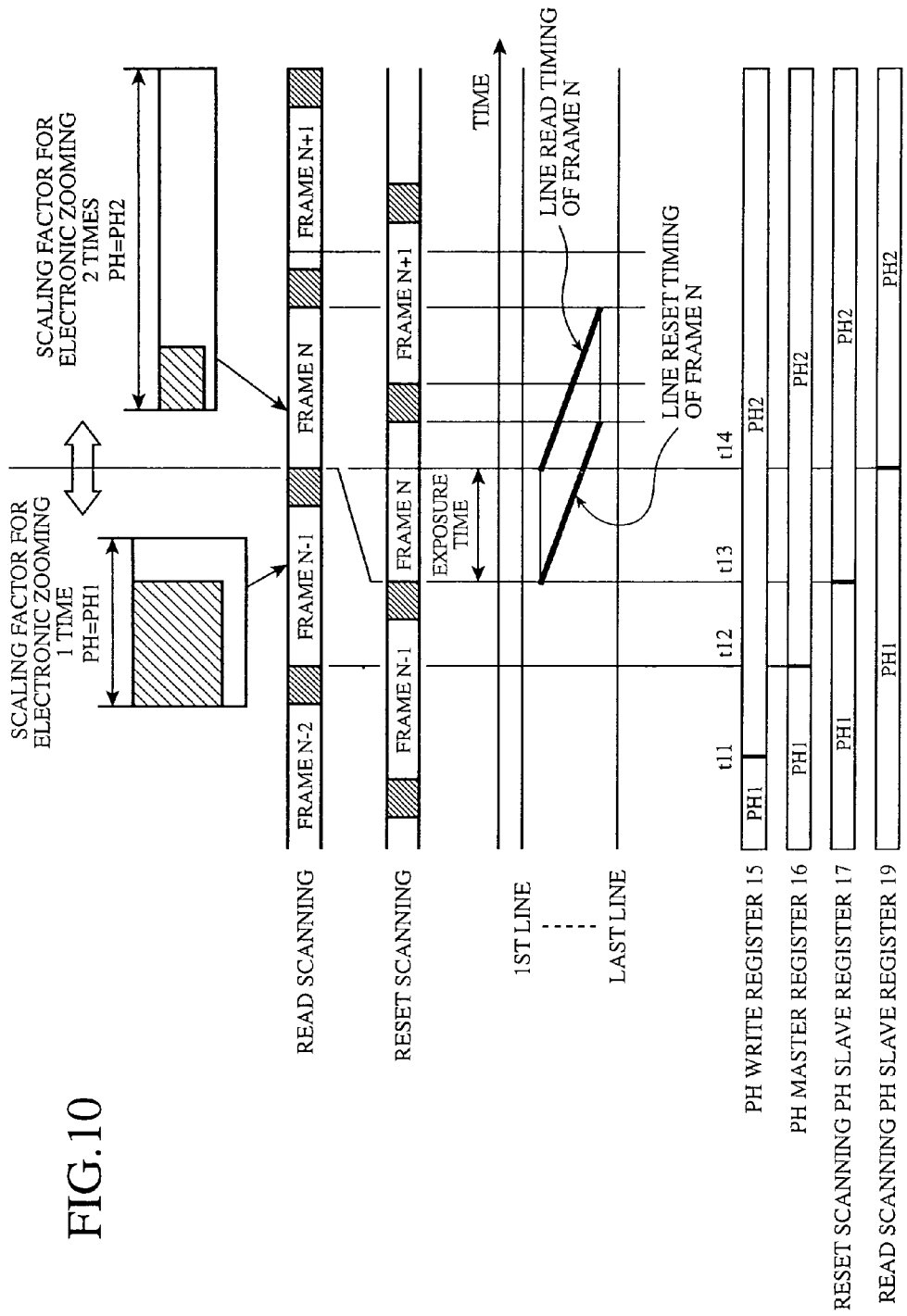
FIG. 10 is a diagram showing timing at which the image sensor of the image pickup device in accordance with embodiment 1 of the present invention performs the reset scanning on each frame, and timing at which the image sensor performs the read scanning on each frame when the exposure time of the image sensor is long and the scaling factor for electronic zooming of the image sensor changes.

FIG. 10 is a diagram showing the timing at which the image sensor of the image pickup device in accordance with embodiment 1 of the present invention performs the reset scanning on each frame, and the timing at which the image sensor performs the read scanning on each frame when the exposure time of the image sensor is long and the scaling factor for electronic zoom changes. Like FIG. 8, FIG. 10 shows a case where the image sensor is instructed to read up to the (N−1)th frame immediately preceding the Nth frame with a zooming scaling factor of one (i.e., the horizontal scanning period PH=PH1) and to read the Nth frame and later frames with a zooming scaling factor of two (i.e., the horizontal scanning period PH=PH2) when the exposure time is long and the reset scanning period of the Nth frame partially overlaps the read scanning period of the immediately preceding (N−1)th frame. FIG. 10 shows the timing at which the PH 101 (i.e., PH1 or PH2) is written into each of the PH write register 15, the PH master register 16, the reset scanning PH slave register 17, and the read scanning PH slave register 19, which are shown in FIG. 9.

In FIG. 9, each of the PH write register 15, the PH master register 16, the reset scanning PH slave register 17, and the read scanning PH slave register 19 is holding the horizontal scanning period PH 101=PH1 corresponding to the zooming scaling factor of one which is set for up to the immediately preceding (N−1)th frame. When the zooming scaling factor changes from one time to two times, the horizontal scanning period PH 101=PH2 outputted from the image pickup control unit 4 is written into the PH write register 15 first. This writing of the horizontal scanning period PH 101=PH2 into the PH write register 15 is performed at a time which is earlier than the timing at which the frame from which the zooming scaling factor has been changed will be read by two frames.

That is, in FIG. 10, when changing the zooming scaling factor from the Nth frame, the horizontal scanning period PH I01=PH2 corresponding to the scaling factor for electronic zooming, which has been changed to two times, is written into the PH write register 15, which has been holding the horizontal scanning period PH 101=PH1 corresponding to the scaling factor of one for electronic zooming until now, at a time t11 during the read scanning of the (N−2)th frame second immediately preceding the Nth frame.

Next, at a time t12 when the image sensor starts the read scanning of the next frame on which it performs the read scanning for the next time, i.e., the (N−1)th frame of FIG. 10, the timing control unit 14 outputs the read scanning start timing signal 220 to the PH master register 16 and the horizontal scanning period PH 101=PH2 currently being held by the PH write register 15 is written into the PH master register 16.

Then, at a time t13 when the image sensor starts the reset scanning of the next frame on which it performs the reset scanning for the next time, i.e., the Nth frame, the timing control unit 14 outputs the reset scanning start timing signal 210 to the reset scanning PH slave register 17 and the horizontal scanning period PH 101=PH2 currently being held by the PH master register 16 is written into the reset scanning PH slave register 17.

The reset scanning PH counter 18 counts the number of pixels of each line until a time that has elapsed since the reset scanning on each line was started agrees with the horizontal scanning period PH 101=PH2 currently being held by the reset scanning PH slave register 17, and then outputs a line clock 111 every time when the image sensor finishes performing the reset scanning on each line. Thus, as shown in FIG. 10, the gradient with respect to time of the line reset timing for the reset scanning of the Nth frame corresponds to the changed horizontal scanning period PH 101=PH2.

Next, at a time t14 when the image sensor starts the read scanning of the next frame on which it performs the read scanning for the next time, i.e., the Nth frame, the timing control unit 14 outputs the read scanning start timing signal 220 to the read scanning PH slave register 19 and the horizontal scanning period PH 101=PH2 currently being held by the PH master register 16 is written into the read scanning PH slave register 19.

The read scanning PH counter 20 counts the number of pixels of each line until a time that has elapsed since the read scanning on each line was started agrees with the horizontal scanning period PH 101=PH2 currently being held by the read scanning PH slave register 19, and then outputs a line clock 112 every time when the image sensor finishes performing the read scanning on each line. Thus, as shown in FIG. 10, the gradient with respect to time of the line read timing for the read scanning of the Nth frame corresponds to the changed horizontal scanning period PH 101=PH2.

Thus, when the image sensor is instructed to read image data about the Nth frame and later frames from the pixel array with a zoom scaling factor of two (i.e., the horizontal scanning period PH 101=PH2), the gradient with respect to time of the line reset timing for the reset scanning of the Nth frame, as well as the gradient with respect to time of the line read timing for the read scanning of the Nth frame, correspond to the changed horizontal scanning period PH2 and therefore the exposure time is kept constant. As a result, a uniform image can be provided for the Nth frame.

As mentioned above, in accordance with this embodiment 1, the image pickup control unit 4 specifies a scan area in which it has changed the horizontal scanning period and the vertical scanning period based on the scaling factor for electronic zooming for each frame, the image sensor 1 performs the reset scanning on each line of the scan area of each frame specified by the image pickup control unit 4, converts incoming light signals into electric signals and accumulates each of the electric signals in the pixel array 11 disposed within the image sensor 1, reads the electric signals accumulated in the pixel array 11 by performing the read scanning on the pixel array 11, and outputs them as image data, the RW control unit 6 writes the image data about at least one line of the image data about each frame outputted from the image sensor 1 in the register 5 based on the scaling factor for electronic zooming and reads at least the one line of the image data currently being held by the register 5 at a predetermined frame rate, and the resolution converting unit 7 performs interpolation processing on the image data read from the register based on the scaling factor for electronic zooming so as to convert the image data into image data having a size of one frame. Therefore, the present embodiment offers an advantage of being able to keep the frame rate constant when performing electronic zooming on the image data without using a large amount of frame memory.

According to this embodiment 1, when the image sensor 1 receives an instruction for changing,the horizontal scanning period and vertical scanning period of an Nth frame and later frames included in a series of frames from the image pickup control unit 4, the image sensor can keep the exposure time of the Nth frame constant by performing the reset scanning and the read scanning on the Nth frame based on the horizontal scanning period and the vertical scanning period which have been changed even when the reset scanning period of the Nth frame partially overlaps the read scanning of the (N−1)th frame immediately preceding the Nth frame. As a result, a uniform image can be provided for the Nth frame.

In FIG. 1 of this embodiment 1, the resolution converting unit 7 can be alternatively placed between the image sensor 1 and the register 5. The resolution converting unit 7 can perform interpolation processing on the image data read from the image sensor 1 based on the scaling factor for electronic zooming, and the RW control unit 6 can temporarily store the image data on which the interpolation processing has been carried out in the register 5 based on the scaling factor for electronic zooming and can read the image data at a predetermined frame rate. The image pickup device in accordance with this variant can keep the frame rate constant when performing electronic zooming.

Embodiment 2

In accordance with above-mentioned embodiment 1, even if the scaling factor for electronic zooming is changed when the reset scanning period of an Nth frame partially overlaps the read scanning of an immediately preceding (N−1)th frame, the image pickup device keeps the exposure time constant by making the gradient with respect to time of the line reset timing for the reset scanning of the Nth frame agree with the gradient with respect to time of the line read timing for the read scanning of the Nth frame. However, when changing the exposure time from a short one to a long one and the reset scanning period of the Nth frame partially overlaps the read scanning of the immediately preceding (N−1)th frame, for example, the image pickup device cannot keep the exposure time of the (N−1)th frame constant, and therefore cannot provide a uniform image for the (N−1)th frame. In contrast, an image pickup device in accordance with this embodiment 2 can keep the exposure time of the (N−1)th frame constant and can provide a uniform image for the (N−1)th frame even in such a case.

Figure 11:
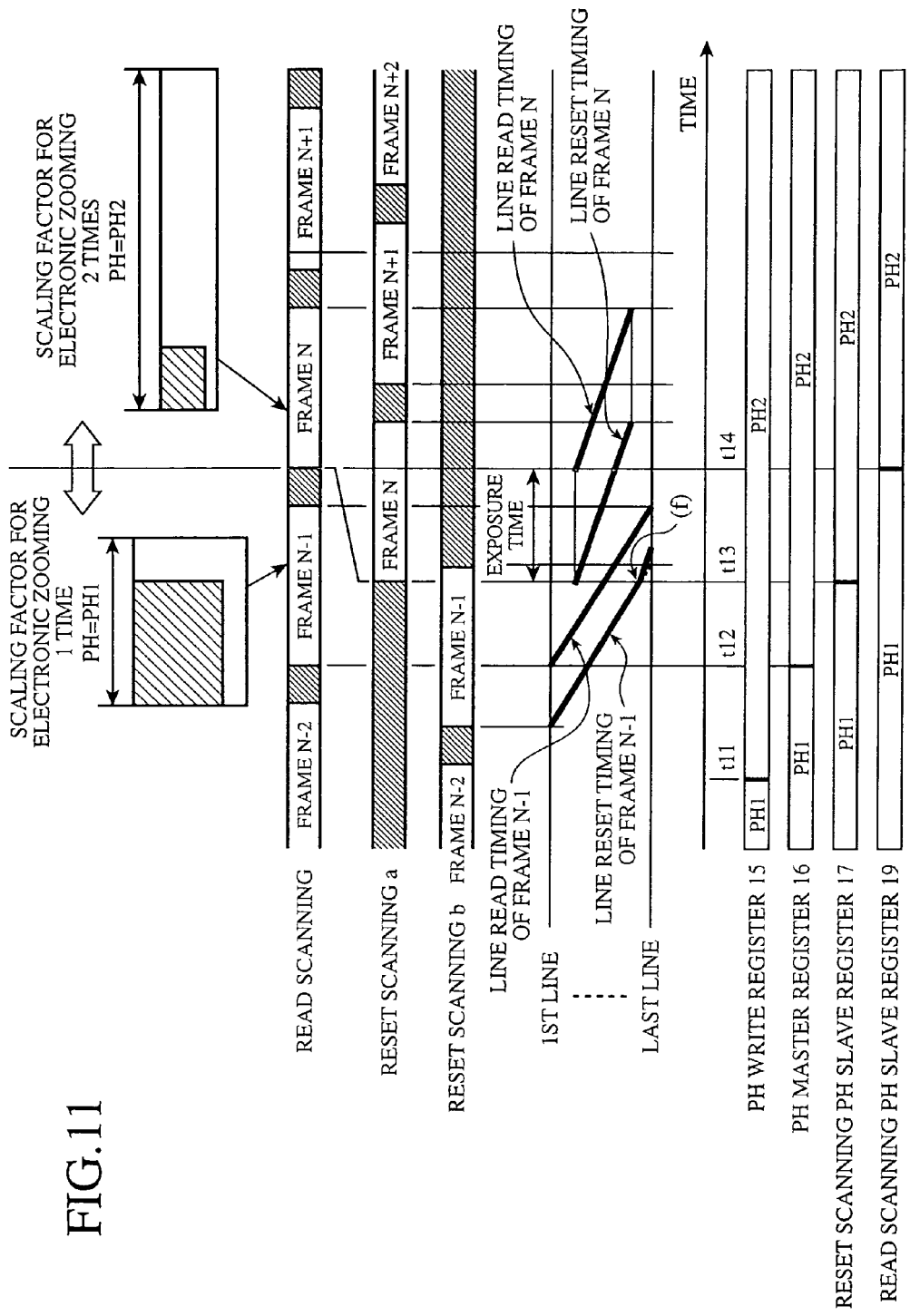
FIG. 11 is a diagram showing timing at which the image sensor performs the reset scanning on each frame, and timing at which the image sensor performs the read scanning on each frame when the scaling factor for electronic zooming of the image sensor changes while the exposure time of the image sensor changes from a short one to a long one.

FIG. 11 is a diagram showing the timing at which an image sensor of the image pickup device in accordance with embodiment 2 of the present invention performs the reset scanning on each frame, and the timing at which the image sensor performs the read scanning on each frame when the scaling factor for electronic zooming is changed while the exposure time of the image sensor is changed from a short one to a long one. Like FIG. 10, FIG. 11 shows a case where the exposure time is long and the reset scanning period of the Nth frame partially overlaps the read scanning period of the immediately preceding (N−1)th frame, and the reset scanning period of the Nth frame whose exposure time is long partially overlaps the reset scanning period of the immediately preceding (N−1)th frame whose exposure time is short.

In FIG. 11, the reset scanning period of the Nth frame overlaps the reset scanning period of the (N−1)th frame at a part designated by (f). When a horizontal scanning period PH 101=PH2 based on the changed zoom scaling factor is written into a reset scanning PH slave register 17 of FIG. 9 at a time t13, the line reset timing having a gradient corresponding to the horizontal scanning period PH 101=PH2 can be obtained for the reset scanning of the Nth frame by the first reset scanning circuit 12a of FIG. 9. The gradient of the line reset timing for the reset scanning of the (N−1)th frame by the second reset scanning circuit 12b of FIG. 9 changes from the one corresponding to the horizontal scanning period PH 101=PH1 to the one corresponding to the horizontal scanning period PH 101=PH2. Therefore, the exposure time of the (N−1)th frame constant cannot be kept constant, and therefore a uniform image cannot be provided for the (N−1)th frame.

Figure 12:
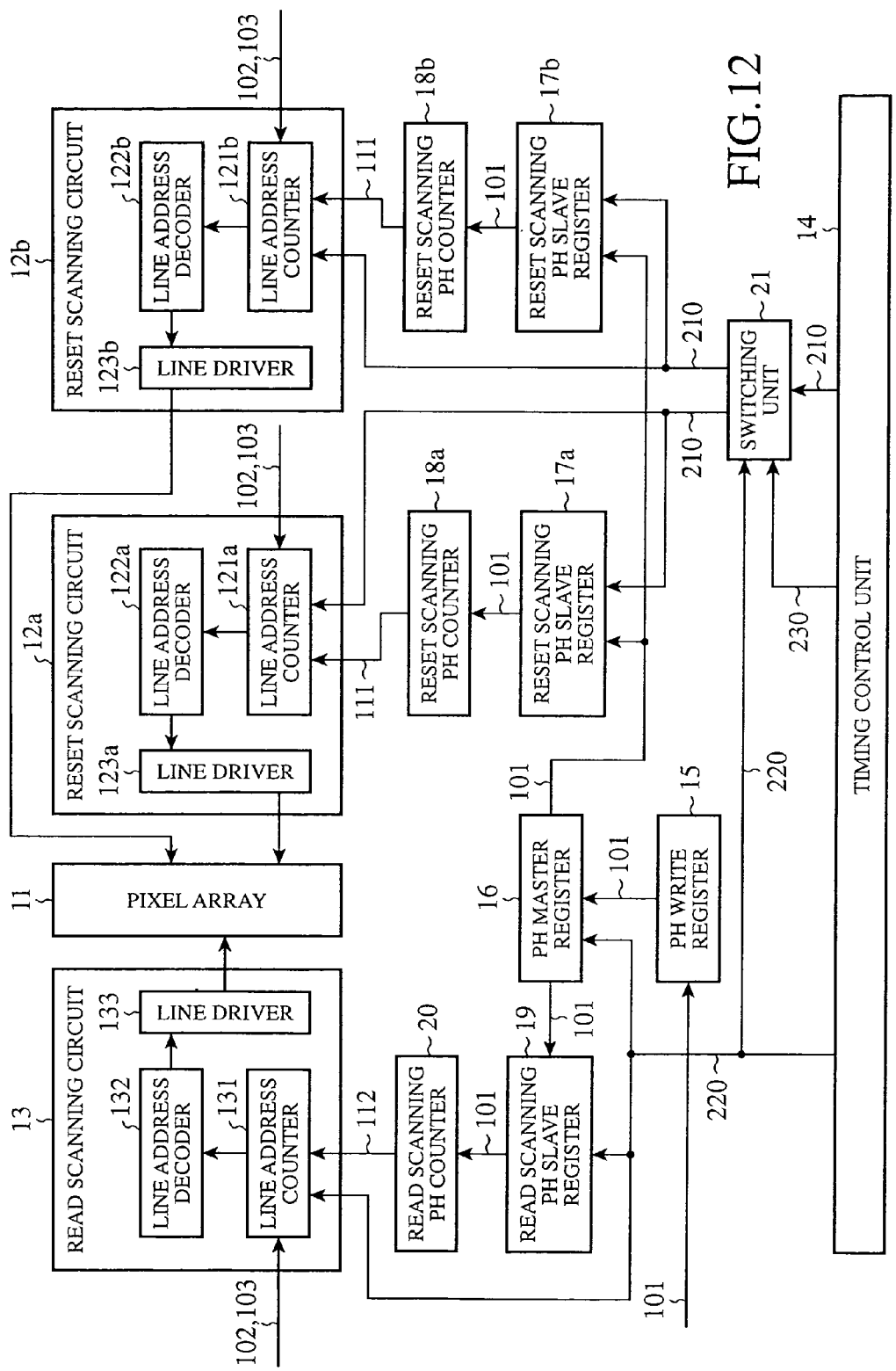
FIG. 12 is a diagram showing the internal structure of an image sensor of an image pickup device in accordance with embodiment 2 of the present invention.

FIG. 12 is a diagram showing the internal structure of an image sensor of the image pickup device in accordance with embodiment 2 of the present invention. The image sensor 1 shown in FIG. 12 differs from the image sensor 1 shown in FIG. 9 in that the image sensor 1 shown in FIG. 12 includes a first reset scanning PH slave register 17a and a second reset scanning PH slave register 17b, a first reset scanning PH counter 18a and a second reset scanning PH counter 18b, and a switching unit 21 for alternately switching the destination of delivery of a reset scanning start timing signal 210 which determines the timing at which the image sensor writes the contents of a PH master register 16 into both the first and second reset scanning PH slave registers 17a and 17b between the first reset scanning PH slave register 17a (i.e., a first output) and the second reset scanning PH slave register 17b (i.e., a second output) according to a read scanning start timing signal 220 or an exposure-time change signal 230 from a timing control unit 14.

Next, the operation of the image pickup device in accordance with embodiment 2 of the present invention will be explained. The timing control unit 14 outputs both the reset scanning start timing signal 210 and the read-scanning start timing signal 220 for each frame, like the timing control unit 14 of embodiment 1 shown in FIG. 9, and also outputs the exposure-time change signal 230 indicating that the exposure time has been changed or that the exposure time has been changed from a short one to a long one. A PH write register 15, the PH master register 16, a read scanning PH slave register 19, a read scanning PH counter 20, and a read scanning circuit 13 operate in the same way as those of embodiment 1 shown in FIG. 9, respectively.

The switching unit 21 switches the destination of delivery of the reset scanning start timing signal 210 between the first reset scanning PH slave register 17a and the second reset scanning PH slave register 17b every time when the read scanning start timing signal 220 from the timing control unit 14 is inputted thereto. As an alternative, the switching unit 21 can switch the destination of delivery of the reset scanning start timing signal 210 between the first reset scanning PH slave register 17a and the second reset scanning PH slave register 17b every time when the exposure-time change signal 230 from the timing control unit 14 is inputted thereto.

The horizontal scanning period PH 101 currently being held by the PH master register 16 is written into the first reset scanning PH slave register 17a in synchronization with the reset scanning start timing signal 210 from the timing control unit 14 via the switching unit 21, and is held until the next reset scanning start timing comes. The first reset scanning PH counter 18a counts the number of pixels of each line until a time that has elapsed since the reset scanning on each line was started agrees with the horizontal scanning period PH 101 currently being held by the first reset scanning PH slave register 17a, and outputs a line clock 111 every time when the reset scanning on each line is completed.

Similarly, the horizontal scanning period PH 101 currently being held by the PH master register 16 is written into the second reset scanning PH slave register 17b in synchronization with the reset scanning start timing signal 210 from the timing control unit 14 via the switching unit 21, and is held until the next reset scanning start timing comes. The second reset scanning PH counter 18b counts the number of pixels of each line until a time that has elapsed since the reset scanning on each line was started agrees with the horizontal scanning period PH 101 currently being held by the second reset scanning PH slave register 17b, and outputs a line clock 111 every time when the reset scanning on each line is completed.

When the reset scanning start timing signal 210 is delivered thereto from the timing control unit 14 via the switching unit 21, a line address counter 121a of the first reset scanning circuit 12a accepts a vertical scanning start line VSTRT 102 and the number of vertical scanning lines VSIZE 103 which indicate an effective pixel area outputted from the image pickup control unit 4, sets the vertical scanning start line VSTRT 102 to an initial value, and keeps counting the line clock 111 until the reset scanning is performed on a vertical scanning end line defined by VEND=VSTRT+VSIZE−1. After that, the line address counter 121a outputs an output mask signal until the vertical scanning start line VSTRT 102 is set to the initial value for the next time. A line address decoder 122a decodes the value of the line address counter 121a, and, while the output mask signal is outputted by the line address counter 121a, masks its decoded output. A line driver 123a simultaneously selects two or more pixels at a line address decoded by the line address decoder 122a, and performs the reset scanning on a pixel array 11.

Similarly, when the reset scanning start timing signal 210 is delivered thereto from the timing control unit 14 via the switching unit 21, a line address counter 121b of the second reset scanning circuit 12b accepts the vertical scanning start line VSTRT 102 and the number of vertical scanning lines VSIZE 103 which indicate the effective pixel area outputted from the image pickup control unit 4, sets the vertical scanning start line VSTRT 102 to an initial value, and keeps counting the line clock 111 until the reset scanning is performed on the vertical scanning end line defined by VEND=VSTRT+VSIZE−1. After that, the line address counter 121*b* outputs an output mask signal until the vertical scanning start line VSTRT 102 is set to the initial value for the next time. A line address decoder 122*b* decodes the value of the line address counter 121*b*, and, while the output mask signal is outputted by the line address counter 121*b*, masks its decoded output. A line driver 123*b* simultaneously selects two or more pixels at a line address decoded by the line address decoder 122*b*, and performs the reset scanning on the pixel array 11.

Figure 13:
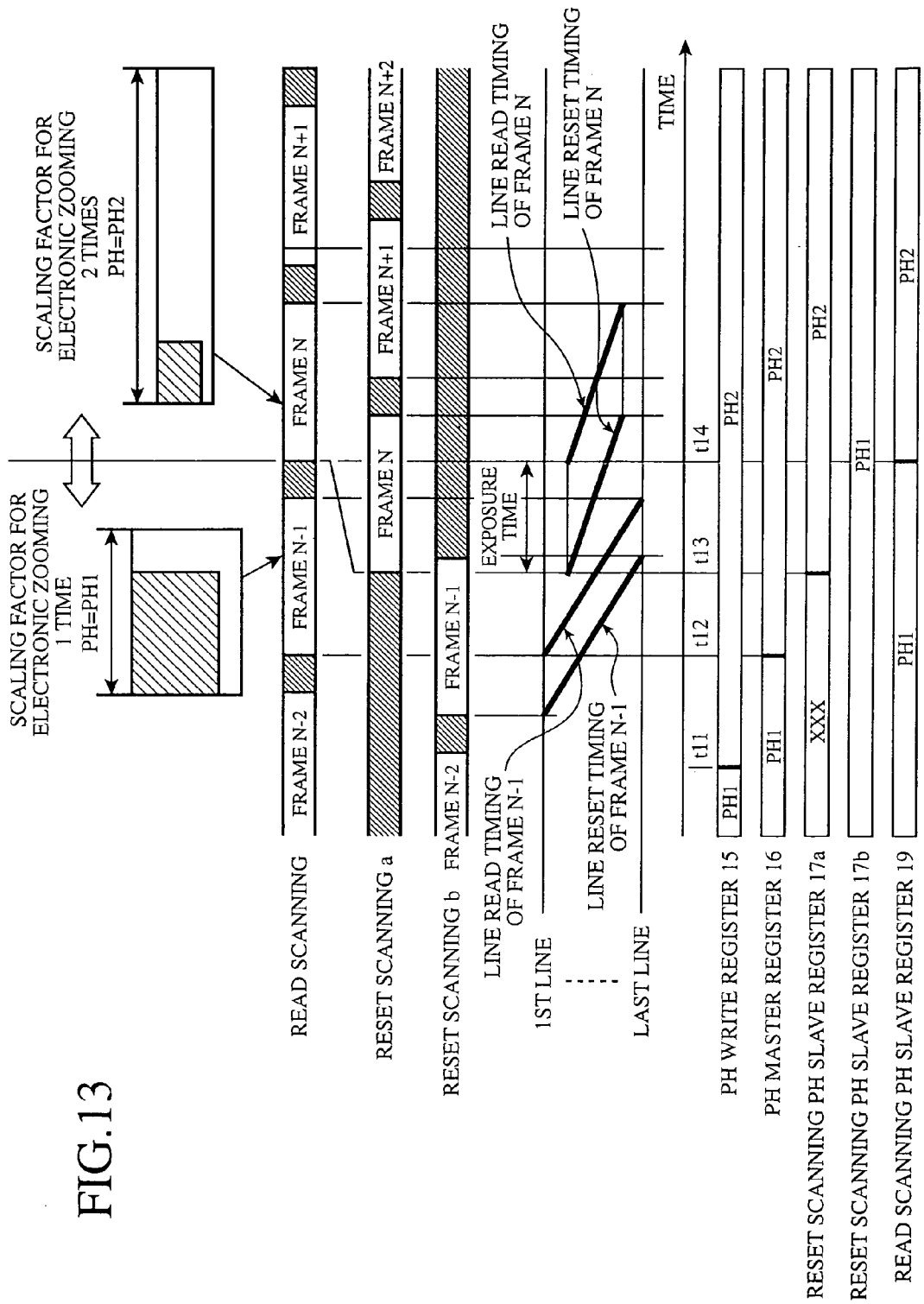
FIG. 13 is a diagram showing timing at which the image sensor of the image pickup device in accordance with embodiment 2 of the present invention performs the reset scanning on each frame, and timing at which the image sensor performs the read scanning on each frame when the exposure time of the image sensor is long and the scaling factor for electronic zooming of the image sensor changes.

FIG. 13 is a diagram showing the timing at which the image sensor of the image pickup device in accordance with embodiment 2 of the present invention performs the reset scanning on each frame, and the timing at which the image sensor performs the read scanning on each frame when the scaling factor for electronic zooming is changed while the exposure time of the image sensor is changed from a short one to a long one. Like FIG. 11, FIG. 13 shows a case where when the exposure time is long and the reset scanning period of an Nth frame partially overlaps the read scanning period of an (N−1)th frame immediately preceding the Nth frame, and the reset scanning period of the Nth frame whose exposure time is long partially overlaps the reset scanning period of the immediately preceding (N−1)th frame whose exposure time is short, the image sensor is instructed to read up to the immediately preceding (N−1)th frame with a zooming scaling factor of one (i.e., the horizontal scanning period PH 101=PH1) and to read the Nth frame and later frames with a zooming scaling factor of two (i.e., the horizontal scanning period PH 101=PH2). FIG. 13 shows the timing at which the PH 101 (i.e., PH1 or PH2) is written into each of the PH write register 15, the PH master register 16, the first and second reset scanning PH slave registers 17*a* and 17*b*, and the read scanning PH slave register 19, which are shown in FIG. 12.

In FIG. 12, each of the PH write register 15, the PH master register 16, the second reset scanning PH slave register 17*b*, and the read scanning PH slave register 19 is holding the horizontal scanning period PH 101=PH1 corresponding to the zoom scaling factor of one which is set for up to the immediately preceding (N−1)th frame. In this case, it is assumed that the first reset scanning PH slave register 17*a* is holding an arbitrary horizontal scanning period PH 101.

In FIG. 13, when changing the zoom scaling factor from the Nth frame, the horizontal scanning period PH 101=PH2 corresponding to the scaling factor for electronic zooming, which has been changed to two times, is written into the PH write register 15, which has been holding the horizontal scanning period PH 101=PH1 corresponding to the scaling factor of one for electronic zooming until now, at a time t11 during the read scanning of the (N−2)th frame second immediately preceding the Nth frame.

Next, at a time t12 when the image sensor starts the read scanning of the (N−1)th frame of FIG. 13, the timing control unit 14 outputs the read scanning start timing signal 220 to the PH master register 16 and the horizontal scanning period PH 101=PH2 currently being held by the PH write register 15 is written into the PH master register 16. The timing control unit 14 also causes the switching unit 21 to switch the destination of delivery of the reset scanning start timing signal 210 from the second reset scanning PH slave register 17*b* to the first reset scanning PH slave register 17*a*, for example. As an alternative, the timing control unit 14 can deliver the exposure-time change signal 230 indicating that the exposure time has been changed or that the exposure time has been changed from a short one to a long one to the switching unit 21 so as to cause the switching unit 21 to switch the destination of delivery of the reset scanning start timing signal 210 from the second reset scanning PH slave register 17*b* to the first reset scanning PH slave register 17*a*.

Then, at a time t13 when the image sensor starts the reset scanning of the next frame on which it performs the reset scanning for the next time, i.e., the Nth frame, the timing control unit 14 outputs the reset scanning start timing signal 210 to the first reset scanning PH slave register 17*a* via the switching unit 21 and the horizontal scanning period PH 101=PH2 currently being held by the PH master register 16 is written into the first reset scanning PH slave register 17*a*. At this time, the second reset scanning PH slave register 17*b* keeps holding the horizontal scanning period PH 101=PH1 corresponding to the scaling factor of one for electronic zooming which the second reset scanning PH slave register 17*b* has been holding.

The first reset scanning PH counter 18 counts the number of pixels of each line until a time that has elapsed since the reset scanning on each line was started agrees with the horizontal scanning period PH 101=PH2 currently being held by the first reset scanning PH slave register 17*a*, and then outputs a line clock 111 every time when the image sensor finishes performing the reset scanning on each line. Thus, as shown in FIG. 13, the gradient with respect to time of the line reset timing for the reset scanning of the Nth frame corresponds to the changed horizontal scanning period PH 101=PH2.

On the other hand, the second reset scanning PH counter 18*b* counts the number of pixels of each line until a time that has elapsed since the reset scanning on each line was started agrees with the horizontal scanning period PH 101=PH1 currently being held by the second reset scanning PH slave register 17*b*, and then outputs a line clock 111 every time when the image sensor finishes performing the reset scanning on each line. Thus, as shown in FIG. 13, the gradient with respect to time of the line reset timing for the reset scanning of the (N−1)th frame corresponds to the horizontal scanning period PH 101=PH1 which was set before the time t13.

Next, at a time t14 when the image sensor starts the read scanning of the next frame on which it performs the read scanning for the next time, i.e., the Nth frame, the timing control unit 14 outputs the read scanning start timing signal 220 to the read scanning PH slave register 19 and the horizontal scanning period PH 101=PH2 currently being held by the PH master register 16 is written into the read scanning PH slave register 19. At this time, although the read scanning start timing signal 220 from the timing control unit 14 is also outputted to the switching unit 21 and hence the switching unit 21 switches the destination of delivery of the reset scanning start timing signal 210 from the first reset scanning PH register 17*a* to the second reset scanning PH register 17*b*, the second reset scanning PH register 17*b* keeps holding the horizontal scanning period PH 101=PH1 until the next reset scanning start timing signal 210 from the timing control unit 14 is inputted thereto.

The read scanning PH counter 20 counts the number of pixels of each line until a time that has elapsed since the read scanning on each line was started agrees with the horizontal scanning period PH 101=PH2 currently being held by the read scanning PH slave register 19, and then outputs a line clock 112 every time when the image sensor finishes performing the read scanning on each line. Thus, as shown in FIG. 13, the gradient with respect to time of the line read timing for the read scanning of the Nth frame corresponds to the changed horizontal scanning period PH 101=PH2.

Thus, when the image sensor is instructed to read image data about the Nth frame and later frames from the pixel array with a zoom scaling factor of two (i.e., the horizontal scanning period PH 101=PH2), the gradient with respect to time of the line reset timing for the reset scanning of the Nth frame, as well as the gradient with respect to time of the line read timing for the read scanning of the Nth frame, correspond to the changed horizontal scanning period PH2 and therefore the exposure time is kept constant. As a result, a uniform image can be obtained for the Nth frame. In addition, the gradient with respect to time of the line reset timing for the reset scanning of the (N−1)th frame, as well as the gradient with respect to time of the line read timing for the read scanning of the (N−1)th frame, correspond to the yet-to-be-changed horizontal scanning period PHi and therefore the exposure time is kept constant. As a result, a uniform image can be obtained for the (N−1)th frame.

As mentioned above, this embodiment 2 offers an advantage of being able to keep the frame rate constant when performing electronic zooming on the image data without using a large amount of frame memory, like above-mentioned embodiment 1.

In addition, in accordance with this embodiment 2, when the image sensor 1 receives an instruction for changing the horizontal scanning period and vertical scanning period of an Nth frame and later frames included in a series of frames from the image pickup control unit 4, the image sensor can keep the exposure time of the Nth frame constant by performing the reset scanning and the read scanning on the Nth frame based on the horizontal scanning period and the vertical scanning period which have been changed even when the reset scanning period of the Nth frame partially overlaps the read scanning of the (N−1)th frame immediately preceding the Nth frame. As a result, a uniform image can be provided for the Nth frame. The image sensor can also keep the exposure time of the (N−1)th frame constant by performing the reset scanning and the read scanning on the (N−1)th frame based on the yet-to-be-changed horizontal scanning period and the yet-to-be-changed vertical scanning period even when the reset scanning period of the Nth frame partially overlaps the reset scanning of the (N−1)th frame. As a result, a uniform image can be provided for the (N−1)th frame.

For the sake of simplicity, in above-mentioned embodiments 1 and 2, light shielded pixels are omitted. In a case where the image sensor has a pixel array that scans light shielded pixels, the number of lines including light shielded pixels is counted and factored into the number of lines including effective pixels in the image pickup device in accordance with either one of above-mentioned embodiments 1 and 2. This variant can offer the same advantage as provided by above-mentioned embodiment 1 or 2.

In accordance with above-mentioned embodiments 1 and 2, the image sensor is of focal-plane shutter type (i.e., line transfer type). As an alternative, the image sensor can be of XY access type. The image sensor of XY access type operates in much the same way as that of focal-plane shutter type with the exception that a row address counter, a row address decoder, a row driver, etc. of each of the reset scanning circuit and the read scanning circuit operate differently from the line address counter, line address decoder, line driver, etc. of each of the reset scanning circuit and the read scanning circuit of above-mentioned embodiment 1 or 2. This variant can offer the same advantage as provided by above-mentioned embodiment 1 or 2.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup device comprising:
an image pickup control unit for specifying a scan area of a frame whose horizontal scanning period and vertical scanning period have been changed based on a scaling factor for electronic zooming;
an image sensor for converting light signals accepted thereby into electric signals by performing a reset scanning on each line of the scan area of the frame specified by said image pickup control unit, for accumulating each of the electric signals in a pixel array disposed therein, for reading the electric signals accumulated in said pixel array by performing read scanning on said pixel array and outputting it as image data, and for, in response to an instruction for changing a horizontal scanning period and a vertical scanning period of an Nth frame and later frames in a series of frames from said image pickup control unit, performing reset scanning and read scanning on the Nth frame based on the horizontal scanning period and the vertical scanning period which have been changed even when a reset scanning period of the Nth frame partially overlaps a read scanning period of an (N−1)th frame immediately preceding the Nth frame;
a register for holding a part of the image data of the frame outputted from said image sensor;
an RW control unit for writing the image data about at least the one line of the frame outputted from said image sensor based on the scaling factor for electronic zooming in said register, and for reading the image data about at least the one line of the frame currently being held thereby at a predetermined frame rate; and
a resolution converting unit for performing interpolation processing on the image data read by said RW control unit based on the scaling factor for electronic zooming, and for converting the image data into image data having a size of one frame.

2. The image pickup device according to claim 1, wherein said image sensor includes: a timing control unit for outputting a reset scanning start timing signal for each frame in a cycle which is determined during the vertical scanning period specified from said image pickup control unit in consideration of an exposure time, and for outputting a read scanning start timing signal for each frame in a cycle determined by said vertical scanning period; a PH master register into which the horizontal scanning period specified by said image pickup control unit is written in synchronization with the read scanning start timing signal outputted by said timing control unit; a reset scanning PH slave register into which the horizontal scanning period currently being held by said PH master register is written in synchronization with the reset scanning start timing signal outputted by said timing control unit; a reset scanning PH counter for counting a number of pixels of each line until a time that has elapsed since reset scanning on each line was started agrees with the horizontal scanning period currently being held by said reset scanning PH slave register, and for outputting a line clock for each line; first and second reset scanning circuits each for counting a number of line clocks outputted from said reset scanning PH counter based on a vertical scanning start line and a number of vertical scanning lines which indicate the effective pixel area specified by said image pickup control unit until the reset scanning is performed on a vertical scanning end line of the effective pixel area, for selecting two or more pixels at a line address which is obtained by decoding the counted number of line clocks, and for alternately performing reset scanning on said pixel array according to the reset scanning start timing signal outputted by said timing control unit; a read scanning PH slave register into which the horizontal scanning period currently being held by said PH master register is written in synchronization with the read scanning start timing signal outputted by said timing control unit; a read scanning PH counter for counting a number of pixels of each line until a time that has elapsed since read scanning on each line was started agrees with the horizontal scanning period currently being held by said read scanning PH slave register, and for outputting a line clock for each line; a read scanning circuit for counting a number of line clocks outputted from said read scanning PH counter based on the vertical scanning start line and the number of vertical scanning lines which indicate the effective pixel area specified by said image pickup control unit until the read scanning is performed on the vertical scanning end line of the effective pixel area, for selecting two or more pixels at a line address which is obtained by decoding the counted number of line clocks, and for performing read scanning on said pixel array according to the read scanning start timing signal outputted by said timing control unit.

3. The image pickup device according to claim 1, wherein in response to the instruction for changing the horizontal scanning period and vertical scanning period of the Nth frame and later frames in the series of frames from said image pickup control unit, said image sensor performs reset scanning on the (N−1) th frame based on the yet-to-be-changed horizontal scanning period and the yet-to-be-changed vertical scanning period when the reset scanning period of the Nth frame partially overlaps the reset scanning period of the (N−1)th frame.

4. The image pickup device according to claim 3, wherein said image sensor includes: a timing control unit for outputting a reset scanning start timing signal for each frame in a cycle which is determined during the vertical scanning period specified from said image pickup control unit in consideration of an exposure time, and for outputting a read scanning start timing signal for each frame in a cycle determined by said vertical scanning period; a PH master register into which the horizontal scanning period specified by said image pickup control unit is written in synchronization with the read scanning start timing signal outputted by said timing control unit; a switching unit for switching between a first output thereof and a second output thereof according to the read scanning start timing signal outputted from said timing control unit; a first reset scanning PH slave register into which the horizontal scanning period currently being held by said PH master register is written in synchronization with the reset scanning start timing signal outputted from said timing control unit via the first output selected by said switching unit; a second reset scanning PH slave register into which the horizontal scanning period currently being held by said PH master register is written in synchronization with the reset scanning start timing signal outputted from said timing control unit via the second output selected by said switching unit; a first reset scanning PH counter for counting a number of pixels of each line until a time that has elapsed since reset scanning on each line was started agrees with the horizontal scanning period currently being held by said first reset scanning PH slave register, and for outputting a line clock for each line; a second reset scanning PH counter for counting a number of pixels of each line until a time that has elapsed since reset scanning on each line was started agrees with the horizontal scanning period currently being held by said second reset scanning PH slave register, and for outputting a line clock for each line; a first reset scanning circuit for counting a number of line clocks outputted from said first reset scanning PH counter based on a vertical scanning start line and a number of vertical scanning lines which indicate the effective pixel area specified by said image pickup control unit until the reset scanning is performed on a vertical scanning end line of the effective pixel area, for selecting two or more pixels at a line address which is obtained by decoding the counted number of line clocks, and for performing reset scanning on said pixel array according to the reset scanning start timing signal outputted from said timing control unit via the first output selected by said switching unit; a second reset scanning circuit for counting a number of line clocks outputted from said second reset scanning PH counter based on the vertical scanning start line and the number of vertical scanning lines which indicate the effective pixel area specified by said image pickup control unit until the reset scanning is performed on the vertical scanning end line of the effective pixel area, for selecting two or more pixels at a line address which is obtained by decoding the counted number of line clocks, and for performing reset scanning on said pixel array according to the reset scanning start timing signal outputted from said timing control unit via the second output selected by said switching unit; a read scanning PH slave register into which the horizontal scanning period currently being held by said PH master register is written in synchronization with the read scanning start timing signal outputted by said timing control unit; a read scanning PH counter for counting a number of pixels of each line until a time that has elapsed since read scanning on each line was started agrees with the horizontal scanning period currently being held by said read scanning PH slave register, and for outputting a line clock for each line; and a read scanning circuit for counting a number of line clocks outputted from said read scanning PH counter based on the vertical scanning start line and the number of vertical scanning lines which indicate the effective pixel area specified by said image pickup control unit until the read scanning is performed on the vertical scanning end line of the effective pixel area, for selecting two or more pixels at a line address which is obtained by decoding the counted number of line clocks, and for performing read scanning on said pixel array according to the read scanning start timing signal outputted by said timing control unit.

5. The image pickup device according to claim 4, wherein said timing control unit outputs an exposure-time change signal indicating that an exposure time has changed or it has changed from a short one to a long one, and said switching unit switches between the first output and the second output according to the exposure-time change signal outputted from said timing control unit, instead of the read scanning start timing signal outputted from said timing control unit.

* * * * *